F. F. FLOWLER.

Machine for Gathering Hay.

No. 1,511.

Reissued July 14, 1863.

N. PETERS, Photo-Lithographer, Washington, D. C.

UNITED STATES PATENT OFFICE.

F. F. FOWLER, OF CRANE TOWNSHIP, WYANDOT COUNTY, OHIO.

IMPROVEMENT IN MACHINES FOR GATHERING HAY.

Specification forming part of Letters Patent No. 31,162, dated January 22, 1861; Reissue No. 1,511, dated July 14, 1863.

*To all whom it may concern:*

Be it known that I, F. F. FOWLER, of Crane Township, in the county of Wyandot and State of Ohio, have invented certain new and useful Improvements in Machines for Gathering Hay; and I do hereby declare the following to be a full, clear, and exact description of the construction and operation of the same, reference being had to the accompanying drawings, making a part of this specification, in which—

Figure 1:
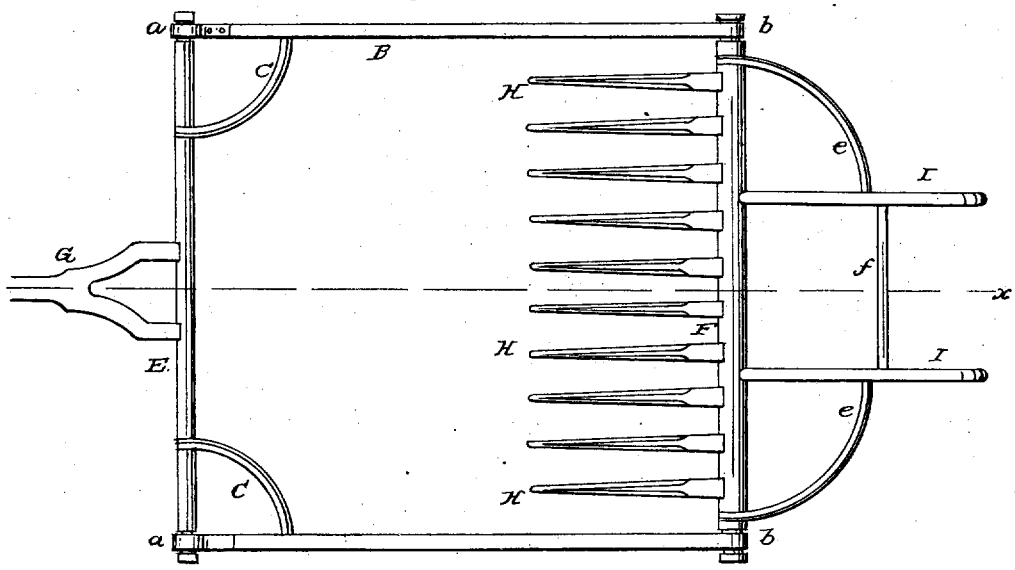
Figure 2:
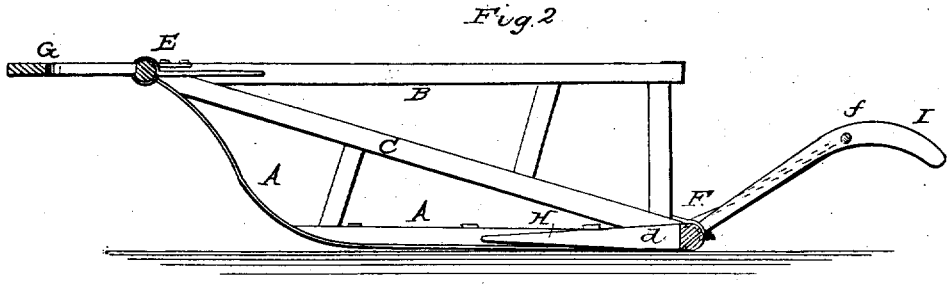

Figure 1 represents a top plan of the hay-gatherer; and Fig. 2 represents a longitudinal vertical section of the same, taken at the red line *x x* of Fig. 1.

The object and purpose of this machine is to gather and transport to the stack or other depository the hay which has been previously raked into a windrow; and the invention consists, first, in uniting the runners and cross-bars by flexible joints, so that the machine may conform to the inequalities of the ground over which it is moving without raising the gathering and carrying fingers therefrom; and it further consists in so combining the fingers with the runners that a portion of the soles of the fingers shall act as supports in contact with the ground as the runners themselves do, both fingers and runners mutually supporting and carrying the load; and it further consists in the combination of a hinged tongue, a turning finger-bar, and the flexibly-connected runners, so constructed and arranged as that the front of the machine may be lowered on the curves or slopes of the runners, while its rear is raised up to allow the fingers to turn over and discharge their load.

To enable others skilled in the art to make and use my invention, I will proceed to describe the same with reference to the drawings.

A represents the runners, of which there are two—one on each side of the machine. B are the runner-rails, braced to the runners A by braces C D, to give them the necessary strength and position in the machine. The runners and their frames or sides are united by the cross-pieces E F, the joints *a a* and *b b* or connections being so made as to prevent the runners or side pieces from spreading, but leaving each side piece or runner free to rise or fall without influencing the other as they accommodate themselves to the inequalities of the ground over which they may for the time being be passing. The cross-piece E, I use also as a tongue-bar for the tongue G, which is connected at its forward end to the necks of the horses or team, and the cross-piece, being hung like a tongue-roller, allows the front end of the machine to pitch downward on the curve of the runners when it becomes necessary to discharge the load of hay carried by the machine. The sides B may be braced to the cross-piece E by the curved braces *c*, one end of which may be fastened to the side piece and the other end be loosely attached to the cross-piece, so that they will neither prevent the cross-piece from rolling in its supports nor prevent the side pieces from rising or falling to such inequalities in the ground as are usually encountered in meadows or grass-fields. The cross-bar F, I use as a finger-bar, it being hung low down to the heels of the runners by journals on which it can turn. To this bar F are united the fingers H, which are made with a portion of their soles, as at *d*, so that they will have a bearing and run steadily upon the ground. This bearing *d*, being on a plane with the soles of the runners, makes a bearing-surface throughout the width of the machine at its rear, which enables the fingers supported by the runners to carry their load without danger of being shaken or thrown off.

The handles I are united to the cross-bar F, and these handles may be braced by braces *e f*.

By running the machine along the windrow, with one runner on each side thereof, the fingers will load themselves with the hay, and when loaded the machine acts as a sled, by which the load may be drawn to the stack or other depository. When the hay is to be unloaded the operator, by means of the handles I, raises up the rear of the machine, the front by the same act descending until the fingers turn over and drop the load. If the team be in motion, this dumping or unloading is facilitated thereby, the machine passing from the hay. The quantity of hay that can be conveyed by this machine is very large, the sides, fingers, handles, and their braces serving as a cradle for containing it, and very much expedites the hauling and stacking of hay in the field.

Having thus fully described the nature and object of my invention, what I claim therein as new, and desire to secure by Letters Patent, is—

1. Connecting the sides and cross-pieces of the machine together by flexible or yielding joints, so that either side of the machine may rise or fall in yielding to the inequalities of the ground independent of the other side, substantially as described.

2. So constructing and combining the fingers with the runners as that the rear under portions of the fingers shall also act as runners and supporters, and mutually aid and be aided by the runners proper in carrying the load, substantially as described.

3. The combination of a hinged tongue, a turning finger-bar, and the flexibly-connected runners, so that as the machine is raised behind it may roll down in front on the curve of the runners for the purpose of dumping or discharging the load, substantially as herein described.

F. F. FOWLER.

Witnesses:
T. E. GRISEN,
E. R. WOOD.